(12) United States Patent
Armangau et al.

(10) Patent No.: US 11,204,703 B2
(45) Date of Patent: *Dec. 21, 2021

(54) TECHNIQUES FOR SCAVENGING OF FREE PROVISIONED BLOCKS

(71) Applicant: EMC IP Holding Company LLC, Hopkinton, MA (US)

(72) Inventors: Philippe Armangau, Acton, MA (US); Ivan Bassov, Brookline, MA (US); Walter Forrester, Berkeley Heights, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 49 days.

This patent is subject to a terminal disclaimer.

(21) Appl. No.: 16/708,515

(22) Filed: Dec. 10, 2019

(65) Prior Publication Data

US 2020/0117376 A1 Apr. 16, 2020

Related U.S. Application Data

(63) Continuation of application No. 15/966,184, filed on Apr. 30, 2018, now Pat. No. 10,534,556.

(51) Int. Cl.
*G06F 12/00* (2006.01)
*G06F 3/06* (2006.01)
*G06F 16/13* (2019.01)

(52) U.S. Cl.
CPC .......... *G06F 3/0632* (2013.01); *G06F 3/0604* (2013.01); *G06F 3/064* (2013.01); *G06F 3/067* (2013.01); *G06F 3/0643* (2013.01); *G06F 16/13* (2019.01)

(58) Field of Classification Search
None
See application file for complete search history.

(56) References Cited

U.S. PATENT DOCUMENTS 9,430,492 B1 * 8/2016 Bono .................... G06F 16/185

* cited by examiner

*Primary Examiner* — Jason W Blust
(74) *Attorney, Agent, or Firm* — Muirhead and Satumelli, LLC

(57) ABSTRACT

Techniques for scavenging blocks may include: determining, in accordance with a selected option, a set of candidate upper deck file systems, wherein at least a first of the candidate upper deck file systems has storage allocated from at least one block of a lower deck file system; and performing, in accordance with the selected option, scavenging of the set of candidate upper deck file systems to attempt to free blocks of the lower deck file system. Scavenging may include issuing a request to perform hole punching of a backed free block of the first candidate upper deck file system, wherein the backed free block has first provisioned storage that is associated with a block of the lower deck file system. The selected option may be one of multiple options each specifying a different candidate set of upper deck file systems upon which hole punching is performed when selected.

20 Claims, 10 Drawing Sheets

| Option 710 | Description 712 |
|---|---|
| 1 | Perform hole punching only on primary UDFSs (not snapshots) and only for owned/not shared LDFS blocks. |
| 2 | Perform hole punching on primary UDFSs and its snapshots, and only for owned/not shared LDFS blocks. |
| 3 | Perform hole punching only on primary UDFSs (not snapshots) and for all blocks (shared and owned/not shared). |
| 4 | Perform hole punching on primary UDFSs and snapshots, and for all blocks (shared and owned/not shared) |
| 5 | Perform hole punching on primary UDFSs and only oldest snapshots of each primary UDFS, and for all blocks (shared and owned/not shared). |
| 6 | Perform hole punching on primary UDFS and its R/W snapshots for all blocks. Stop condition for hole punching when minimum threshold of free backed blocks remain. |

FIG. 7

TECHNIQUES FOR SCAVENGING OF FREE PROVISIONED BLOCKS

BACKGROUND

Technical Field

This application generally relates to deallocation of provisioned blocks.

Description of Related Art

Systems may include different resources used by one or more host processors. Resources and host processors in the system may be interconnected by one or more communication connections, such as network connections. These resources may include, for example, data storage devices such as those included in the data storage systems manufactured by Dell Inc. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may issue I/O operations, such as data read and write operations, received at a data storage system. Host systems may store and retrieve data by issuing the I/O operations to the data storage system containing a plurality of host interface units, disk drives (or more generally storage devices), and disk interface units. Such data storage systems are provided, for example, by Dell Inc. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

In accordance with aspects of the techniques herein are a method, system, and computer readable medium for scavenging blocks. In accordance with a selected option, a set of candidate upper deck file systems is determined, wherein at least a first of the candidate upper deck file systems has storage allocated from at least one block of a lower deck file system. In accordance with the selected option, scavenging of the set of candidate upper deck file systems is performed to attempt to free blocks of the lower deck file system. Scavenging further includes: issuing a request to perform hole punching of a backed free block of the first candidate upper deck file system, wherein the backed free block has first provisioned storage that is associated with a block of the lower deck file system. Scavenging may also include: determining whether the backed free block has a corresponding lower deck file system block that meets sharing criteria, for restrictive hole punching, specified in the selected option; if it is determined that the backed free block has a corresponding lower deck file system block that meets sharing criteria, for restrictive hole punching, specified in the selected option, performing said hole punching; and if it is determined that the backed free block does not have a corresponding lower deck file system block that meets sharing criteria, for restrictive hole punching, specified in the selected option, not performing said hole punching. It may be determined that the backed free block has a corresponding lower deck file system block that meets sharing criteria, for restrictive hole punching, specified in the selected option, and the hole punching may also include: determining whether the backed free block has a corresponding lower deck file system block that is shared with another lower deck file system entity, or otherwise not shared with another lower deck file system entity; responsive to determining the backed free block has a corresponding lower deck file system block that is not shared with another lower deck file system entity, freeing the corresponding lower deck file system block; and responsive to determining the backed free block has a corresponding lower deck file system block that is shared with another lower deck file system entity, not freeing the corresponding lower deck file system block. Each of the candidate upper deck file systems may be implemented as a file in the lower deck file system, and wherein the first candidate upper deck file system may be implemented as a first file in the lower deck file system, and a second of the candidate upper deck file systems may be implemented as a second file in the lower deck file system. The corresponding lower deck file system block may be shared between only the first and second files of the lower deck file system. The hole punching may also include responsive to determining the backed free block has a corresponding lower deck file system block that is shared with another lower deck file system entity, modifying the status of the corresponding lower deck file system block to not shared. The hole punching may further include updating a status associated with the backed free block of the first candidate upper deck file system to free. The method may also include selecting, in accordance with one or more criteria, the selected option from a plurality of options, wherein each of the plurality of options specifies a different set of candidate upper deck file systems for which scavenging is performed, when said each option is selected, to attempt to free blocks of the lower deck file system. The plurality of options may include at least one of: a first option indicating to perform hole punching only on primary upper deck file systems and not on snapshots of primary upper deck file systems, and wherein hole punching is only performed for blocks of a primary upper deck file system having storage provisioned from corresponding lower deck file system blocks that are not shared; a second option indicating to perform hole punching on both primary upper deck file systems and snapshots of primary upper deck file systems, and wherein hole punching is only performed for blocks of a primary upper deck file system having storage provisioned from corresponding lower deck file system blocks that are not shared; a third option indicating to perform hole punching only on primary upper deck file systems and not on snapshots of primary upper deck file systems, and wherein hole punching is performed for blocks of a primary upper deck file system having storage provisioned from corresponding lower deck file system blocks that are either shared or not shared; a fourth option indicating to perform hole punching on both primary upper deck file systems and snapshots of primary upper deck file systems, and wherein hole punching is performed for blocks of a primary upper deck file system having storage provisioned from corresponding lower deck file system blocks that are either shared or not shared; a fifth option indicating to perform hole punching on primary upper deck file systems and only on oldest snapshots of primary upper deck file systems, and wherein hole punching is performed for blocks of a primary upper deck file system having storage provisioned from corresponding lower deck file system blocks that are either shared or not shared; and a sixth option indicating to perform hole punching on primary upper deck file systems and only read-write snapshots of primary upper deck file systems, and wherein hole punching stops when a minimum threshold of backed free blocks of the upper deck file system remain. A data storage system may include the lower deck file system and a plurality of upper deck file systems, wherein physical storage devices of the data storage system provide provisioned storage for allocated blocks of the lower deck file system mapped to blocks of the plurality of upper deck file systems that have been written to. The one or more criteria may include at least one criteria related to current I/O workload on the data storage system. The one or more criteria may include at least one criteria related to utilization of a component of the data storage system. The at least one criteria may relate to utilization of: a processor that executes code, a component that reads data from and writes data to the physical storage devices, a component that receives I/O requests from a client.

BRIEF DESCRIPTION OF THE DRAWINGS

Features and advantages of the present invention will become more apparent from the following detailed description of exemplary embodiments thereof taken in conjunction with the accompanying drawings in which:

FIG. 7 is a table including options and associated descriptions of selected candidates that may be used in an embodiment in accordance with techniques herein;

DETAILED DESCRIPTION OF EMBODIMENT(S)

Figure 1:
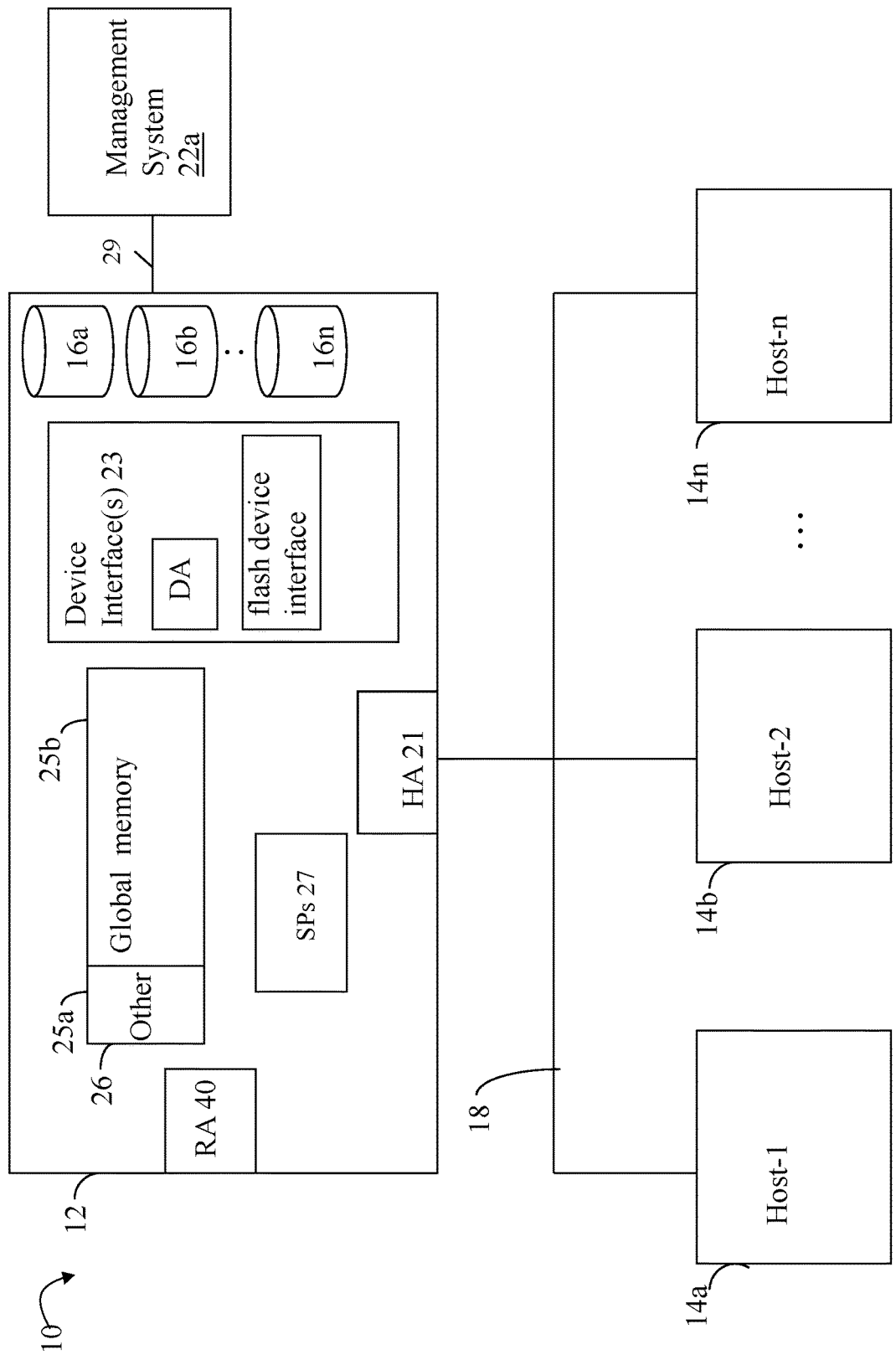
FIG. 1 is an example of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrated the techniques herein, reference may be made to a single data storage array by a vendor, such as by Dell Inc. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving mechanical parts.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a system cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN (s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in FIG. 1 is a management system 22a that may be used to manage and monitor the system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the Dell EMC Unity® data storage system by Dell Inc., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data stored on a data storage system, and also receiving a response (possibly including requested data) in connection such I/O commands (e.g., returning requested read data).

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to FIG. 1, the control commands may be issued from data storage management software executing on management system 22a to the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

The DA physically accesses the back-end non-volatile storage devices, such as physical data storage devices (PDs) 16a-n. Data residing on a PD may be accessed by the DA following a data request in connection with I/O operations that other directors originate. In at least one embodiment, write data received at the data storage system from a host or other client may be initially written to cache memory (e.g., such as may be included in the component designated as 25b) and marked as write pending (WP). At a later point time, the write data (e.g., WP data) may be destaged or flushed from cache to the PDs accessed by a DA. In connection with reads, processing may include first looking to see if the requested read data is in cache whereby a read hit occurs. For a read hit, the read is serviced using the cached copy of the requested read data by returned the cached read data to the requester. Thus, with a read hit, there is no need to access the physical (back end) non-volatile storage by the DA to obtain the requested read data thereby resulting in a faster read I/O response time. If the requested read data is not in cache, the requested read data is obtained from the physical (back end) non-volatile storage by the DA where the read data is then stored in the cache, and returned to the requester. The cached copy of the read data may then be available to further service any other subsequent reads. As known in the art, any suitable cache management techniques may be used to maintain the cache, for example, such as is determining how long data remains in cache, whether to prefetch data, selecting data stored in the cache for eviction, and the like.

In at least one embodiment in accordance with techniques herein, the data storage system may support one or more file system protocols such that a host or other client may send file-based I/O requests (e.g., read, write, delete, create) in accordance with such supported protocols. Additionally, such an embodiment of a data storage system may support one or more data services for use in connection with any one or more types of data storage entities, such as a file, a files system, a LUN, and the like. For example, the data storage services provided may include encryption/decryption, compression/decompression, data deduplication, local and/or remote data replication, snapshots, and, more generally any suitable data storage service known in the art as may be supported in a particular embodiment of a data storage system. Data deduplication, as known in the art, includes performing processing to recognize duplicate data portions. Rather than store multiple duplicate copies of the same data portion, deduplication stores a single unique instance of a data portion and then uses a reference, handle, token and the like, to refer to further detected duplicate copies of the single instance in a data storage entity. As known in the art, data replication involves making a duplicate copy of a data storage entity. Such duplicate may be a complete physical copy or bit for bit replica of the data storage entity. For local replication, the complete physical copy may be stored locally, such as on the same data storage system, as the original or primary data storage entity. For remote replication, the complete physical copy may be stored remotely, such as on a different remote data storage system, from the data storage system hosting the original or primary data storage entity. Remote replicate may be used, for example, for having a duplicate physical copy of data for disaster recovery purposes in the event the primary original copy or site experiences a data loss or data unavailability. Other types of replication techniques may store logical point in time copies of an original or primary data storage system. For example, a snapshot service or facility may make logical point in time copies of an original or primary data storage entity (e.g., LUN, file, file system, directory). Each snapshot is not a physical replica or duplicate of the original entity but is rather a logical point in time copy of the original entity created using any suitable technique known in the art. For example, copy on first write is one such known technique that provides for storing only differences or modifications made to the original entity and preserving the original content as needed to logical reproduce both the original entity and its snapshot.

Data storage systems typically arrange the data and metadata of file systems in blocks of storage. For example, the file data constituting files in a file system are stored in blocks of storage, as are inodes (index nodes), indirect blocks (IBs), and other metadata. Data storage systems may provision storage to file systems in units of fixed size, here called "slices." Data storage systems may generate slices, for example, from one or more physical storage devices, such as RAID groups of physical storage devices.

Some data storage systems provide thinly provisioned file systems. Thinly provisioned file systems may have very large address spaces but allocate specific storage slices to populate file systems only as storage is needed to satisfy write requests. A thinly provisioned file system may thus have an address space that is measured in petabytes but may allocate slices to occupy only a small fraction of the address space. Data storage systems that provide thinly provisioned file systems may deallocate blocks of storage from the file systems when the blocks are no longer used. In at least one existing implementation, a data storage system identifies free blocks of storage in the slices supporting the file system. Any completely freed slices may be returned to a storage pool for later reuse.

At least one existing technique for shrinking or deallocating blocks of a file system is described in U.S. Pat. No. 9,430,492, (the '492 patent) issued on Aug. 30, 2016, entitled EFFICIENT SCAVENGING OF DATA AND METADATA IN FILE SYSTEM BLOCKS, Bono et al., which is incorporated by reference herein. The '492 patent describes a technique that includes identifying backed free blocks of storage in an upper deck file system (UDFS) and freeing blocks in a lower deck files system (LDFS) corresponding to the backed free blocks of the UDFS. Subsequently, space reclamation processing may attempt to identify and gather portions of the freed blocks of the LDFS forming one or more entire free slices which may then be deallocated from the LDFS and returned for reuse as an unallocated slice of the storage pool.

Although not discussed in the '492 patent, in at least one data storage system implementation, it may be that the LDFS block corresponding to a backed free block of the UDFS may actually not be freed. In particular, the data storage system may support one or more data services as mentioned above such as, for example, snapshots and data deduplication. In such a data storage system, the above-mentioned LDFS block may be referenced or in use by more than one data storage entity in connection with the various data services supported by the data storage system. For example, the data storage system may provide data deduplication utilized in connection with two files—FILE1 and FILE2—stored on the data storage system, where each of the two files includes the same duplicate content and thus, may refer to the same LDFS data block storing such content. In FILE 1, a user may delete content stored in the LDFS data block mapped to a first UDFS block of FILE1. The first UDFS block of FILE1 may be identified as a backed free block of the UDFS for which processing may be performed in attempts to free the corresponding LDFS block. However, the LDFS data block may also be mapped to a second UDFS block still included in FILE 2. Thus, an attempt to free the LDFS block would fail since it is still referenced or in use in connection with storing data content for FILE2.

In some data storage system implementations that are not in accordance with techniques herein and that perform processing as described in the '492 patent, such processing may include scanning all provisioned UDFS slices to find free backed UDFS blocks, subsequently performing processing that attempts to free LDFS blocks corresponding to such free backed UDFS blocks, and then performing space reclamation processing. In at least one implementation not in accordance with techniques herein, such processing may be constantly performed and may be excessively resource intensive.

Thus, it may be desirable to reduce or limit the amount of system resources consumed when performing such processing so as not to adversely impact I/O performance as related to the data or I/O path. Furthermore, it may be desirable to use techniques which attempt to balance the effectiveness of space reclamation introduced by scavenging (e.g., with respect to the amount of LDFS blocks actually freed) and the amount of possible unnecessary processing, metadata updating (of various file system structures), and the like. Accordingly, described in following paragraphs are improved scavenging techniques. At least one embodiment in accordance with techniques herein may include selectively, or more specifically, identifying what blocks to scavenge (e.g., such as based on one or more heuristics used to select such blocks from all possible candidate blocks). In at least one embodiment in accordance with techniques herein, processing may include performing scavenging in accordance with a selected one of multiple possible options (e.g., scavenging options). In particular, one or more criteria may be used in connection with selecting one of the multiple possible options. The multiple options may denote different candidate sets for scavenging and hole punching (described in more detail below). For example, each of the options may define different entity selection criteria denoting which data storage entities to select as candidates for scavenging. In at least one embodiment in accordance with techniques herein, the one or more criteria may include at least one criteria that measures the workload and/or utilization of the system. In periods of heavy workload and/or high utilization or consumption of system resources, an option may be selected (relative to other ones of the options) which has a lower or reduced resource consumption and/or may identify a more select, smaller set of LDFS block candidates having a higher probability of being successfully freed. Further, the scavenging may be performed responsive to an occurrence of a defined condition or event, and/or may run continuously as a background process. For example, scavenging may be performed responsive to a user specified action or request to perform scavenging, responsive to an occurrence of predefined or scheduled time at which the scavenging is periodically performed, responsive to an occurrence of a minimum threshold level of LDFS blocks being detected, and the like. The foregoing and other aspects of techniques herein as may be performed in an embodiment are described in more detail in following paragraphs.

Figure 2:
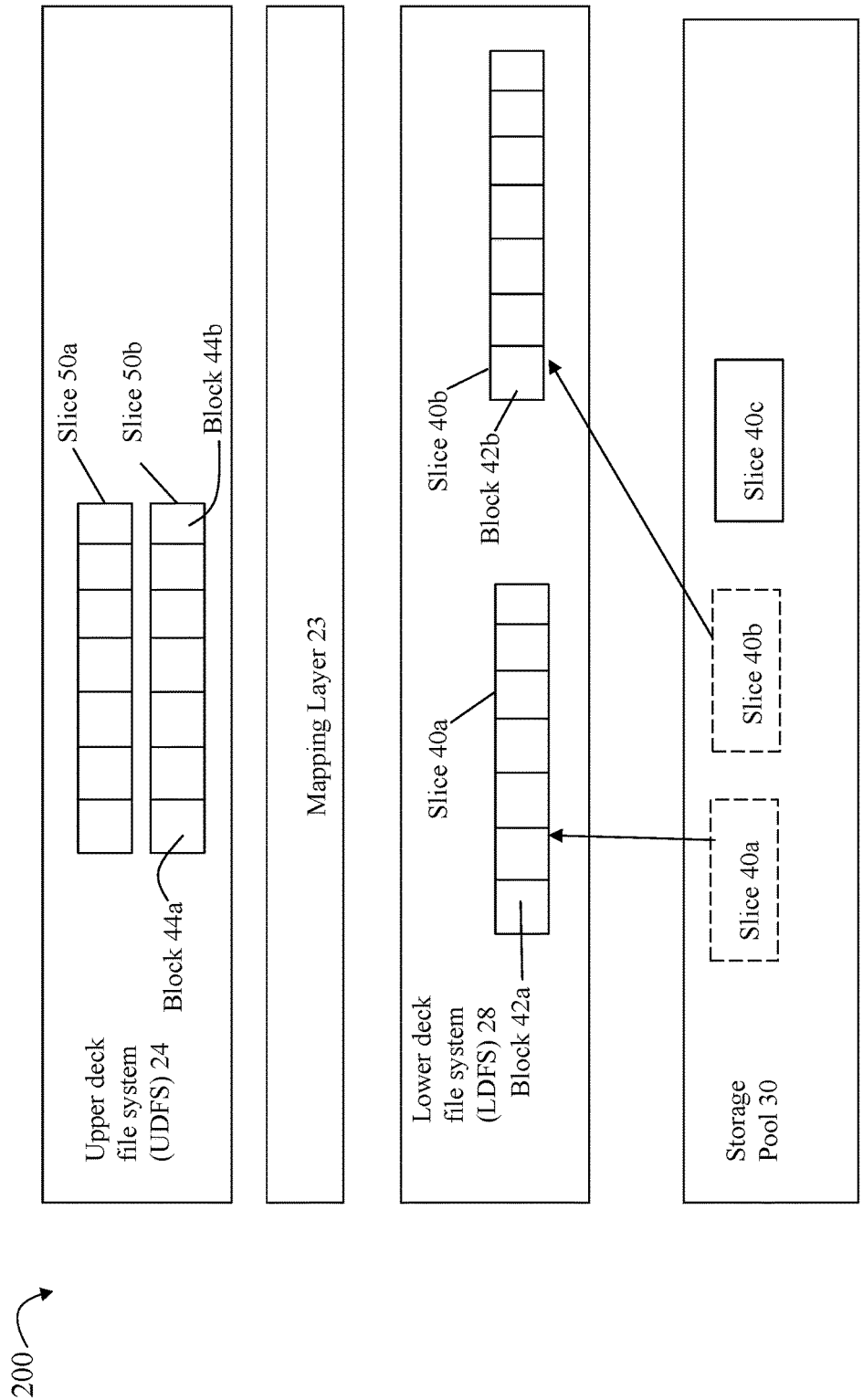
FIGS. 2 and 3 are examples of various file systems and layers that may be included in an embodiment in accordance with techniques herein.

Referring to FIG. 2, shown is an example of components that may be included in an embodiment in accordance with techniques herein. The example 200 includes components that may be included in a data storage system in accordance with techniques herein, such as the data storage system 12 of FIG. 1. In at least one embodiment, a single instance of each of the components of 200 may be stored in a memory of each SP of the data storage system. The example 200 includes an upper deck file system (UDFS) 24, a mapping layer 23, a lower deck file system (LDFS) 28, and a storage pool 30. In the example 200, the UDFS 24 is a host file system, which may be accessed by hosts, such as hosts 14a-14n of FIG. 1, for creating files and/or directories, deleting files and/or directories, deleting a portion of a file, reading files, writing files, and so forth. Within the data storage system 12, in at least one embodiment, the UDFS 24 may be represented internally as a file of the LDFS 28 (described below). Thus, each host-presented UDFS may be implemented as a different file in the LDFS. For example, if the host creates a second file system, the second file system as accessed by and presented to the host may be a second UDFS (not illustrated in FIG. 2) implemented as a corresponding second file in the LDFS.

Mapping layer 23 maps the UDFS 24 to its corresponding underlying file stored in the LDFS 28. For example, particular blocks of the UDFS 24 are mapped to corresponding blocks of the LDFS 28. Storage pool 30 organizes elements of the physical storage, such as of the non-volatile storage PDs 16a-n, in the form of logical partitions or slices. A "slice" is an increment of storage space, such as 256 MB in size, which is drawn from the storage. Pool 30 may allocate slices to the LDFS 28 for use in storing its content. If the storage provided by slices allocated to the LDFS 28 is no longer required, such slices may be deallocated and then returned to the pool 30 for general reuse.

UDFS 24 according to the example 200 includes slices 50a and 50b. Each of slices 50a and 50b contains logical blocks. Slice 50b includes blocks 44a and 44b. Each of the logical blocks in slices 50a and 50b has one of two states: free (i.e., not storing active content) or allocated (e.g., where the block has been written to and possesses data content). Additionally, a free block may be further characterized as backed (i.e., written to and then deleted, associated with a block of storage in the LDFS), or unbacked (i.e., not associated with a block of storage in the LDFS, also just referred to herein sometimes as a free block).

LDFS 28 in the example 200 includes slices 40a and 40b, each of which is provisioned from storage pool 30 and contains blocks of storage including blocks 42a and 42b. In the LDFS 28, blocks in slices 40a and 40b may be free, or allocated. As described in more detail below, for a block of the LDFS that is allocated and that provides backing storage for a corresponding UDFS backed free block, hole punch processing may be requested as described in more detail below which attempts to free the LDFS block and decouples the LDFS block from its corresponding UDFS block.

Storage pool 30 in the example 200 includes slices 40a and 40b. Slices 40a, 40b are provisioned to LDFS 28, while the other slices may be provisioned to other resources or may be free. During example operation, UDFS 24 may be characterized as thinly provisioned where backing storage is provisioned from the LDFS 28 (and thus the pool 30) on demand, as needed, such as when different blocks of the UDFS are written to. Logical blocks, when written into and allocated from LDFS 28, correspond to blocks in slices 40a and 40b that have been provisioned from storage pool 30 by an SP. As illustrated in FIG. 2 block 44a in UDFS 24 which has been written into corresponds to block 42a in LDFS 28. Similarly, block 44b in UDFS 24 corresponds to block 42b in LDFS 28. It should be understood, however, that free blocks in the UDFS 24 do not correspond to any blocks in LDFS 28 until they have been written into, i.e., only backed free blocks in the UDFS 24 correspond to blocks in the LDFS 28.

As a host sends file system requests to write data to blocks in slices 50a and 50b, the SP performs processing that writes the data into blocks of the UDFS and accordingly to corresponding blocks of the LDFS. Upon writing data to a block in LDFS 28, processing performed by the SP allocates that LDFS block of storage to UDFS 24. Until data is written to a block in UDFS 24, however, a free block in UDFS 24 cannot be said to correspond to any blocks in LDFS 28 because, in a thinly provisioned file system as in the example, storage supporting such a block in the UDFS 24 is not allocated until the block has been written into.

At some point, the host may send a file system request that causes the SP to delete the data in block 44b in UDFS 24. For example, a user of the host may delete a file (or a portion thereof) or a directory. Thus, block 44b in the UDFS changes state from "written to" to "backed free". While block 44b is now free, it still maintains its backing allocated storage space in corresponding block 42b of the LDFS 28, whereby block 44b is denoted as a backed free block of the UDFS. At some point processing may be performed as described elsewhere herein in connection with scavenge processing and hole punching, whereby the backing LDFS block 42b may be disassociated with block 44b and block 42b may be freed.

Additionally, at selected points in time, processing may be performed that examines slices 40a and 40b in the LDFS 28. If any slice is only partially filled with contents (e.g., partially allocated), the slice may be evacuated, such that its content is moved to another slice and it is made free of all content. The evacuated slice may then be returned to the pool 30, where it may be repurposed.

Figure 3:
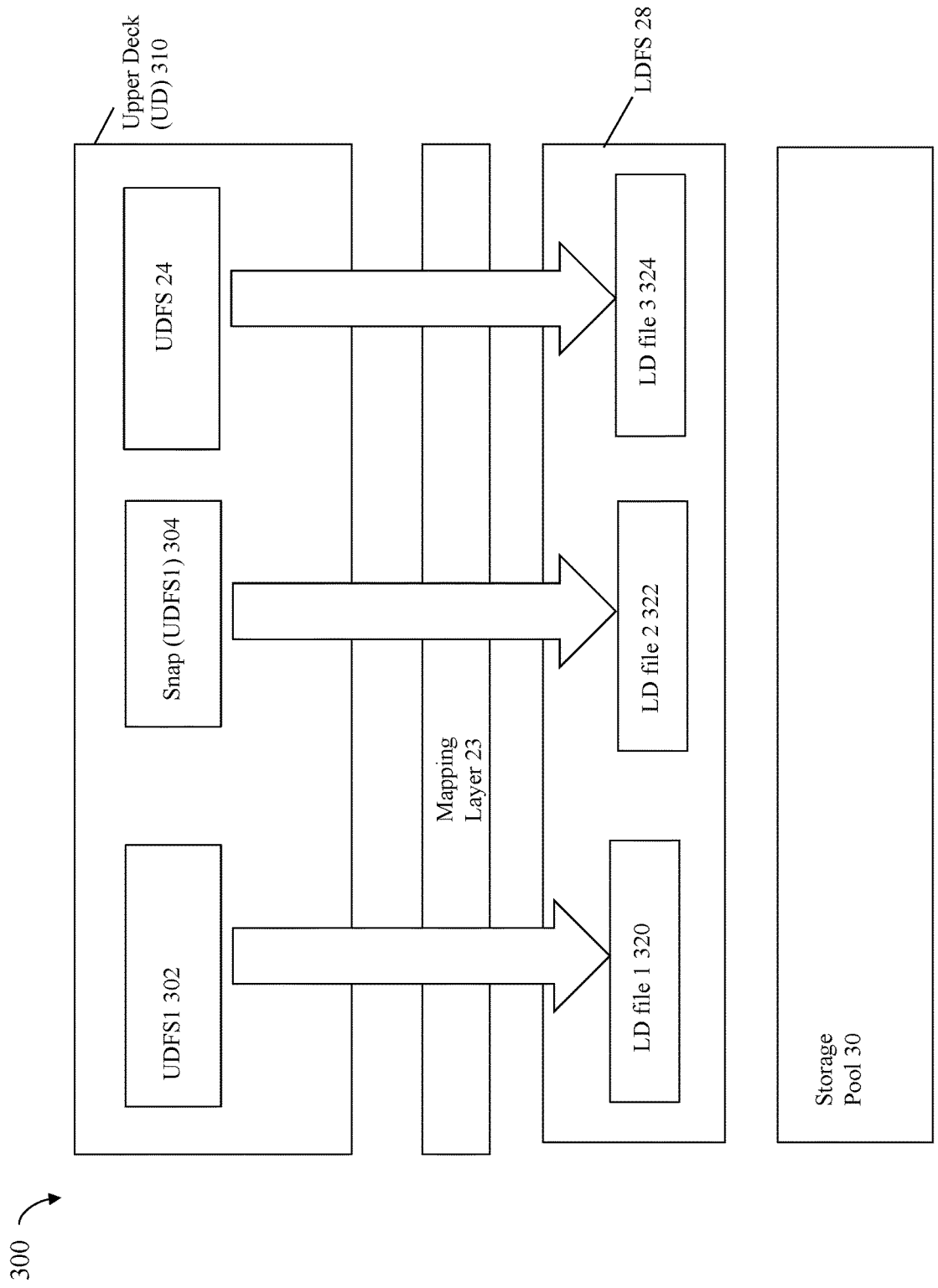

Referring to FIG. 3, shown is another example illustrating mappings between entities in in an embodiment in accordance with techniques herein. The example 300 includes upper deck (UD) 310, LDFS 28, mapping layer 23 and storage pool 30. Element 310 may generally denote the UD which may include one or more UDFSs, such as 302, 304 and 24. FIG. 2 illustrates details regarding a single UDFS 24 where UDFS 24 may be one of multiple file systems of the UD 310. Each of the multiple UD files systems 302, 304, 24, may be implemented, respectively, as a single corresponding file 320, 322, 324 in the LDFS 28. Elements 23, 28 and 30 may be similar to that as described in connection with FIG. 2. Additionally, relative to FIG. 2, LDFS 28 in this example 300 also includes LD file 1 320 and LD file 2 322. As mentioned elsewhere herein, each UDFS presented to a host or other client may be implemented as a corresponding lower deck (LD) file in the LDFS 28. For example, if the host creates UDFS1 302 as a second file system, that is accessed by and presented to the host (e.g., mounted file system), UDFS1 302 may be a second UDFS implemented as a corresponding second file, LD file 1 320, in the LDFS. Additionally, snapshots of an UDFS exposed or presented to a host may also be implemented as a separate corresponding second file in the LDFS. For example suppose a snapshot is taken of UDFS1 302 and then mounted as a separate file system—denoted Snap (UDFS1) 304)—accessible to the host. In at least one embodiment, Snap (UDFS1) 304 may be implemented as yet another separate file, LD file 2 322, of the LDFS 28.

Figure 4:
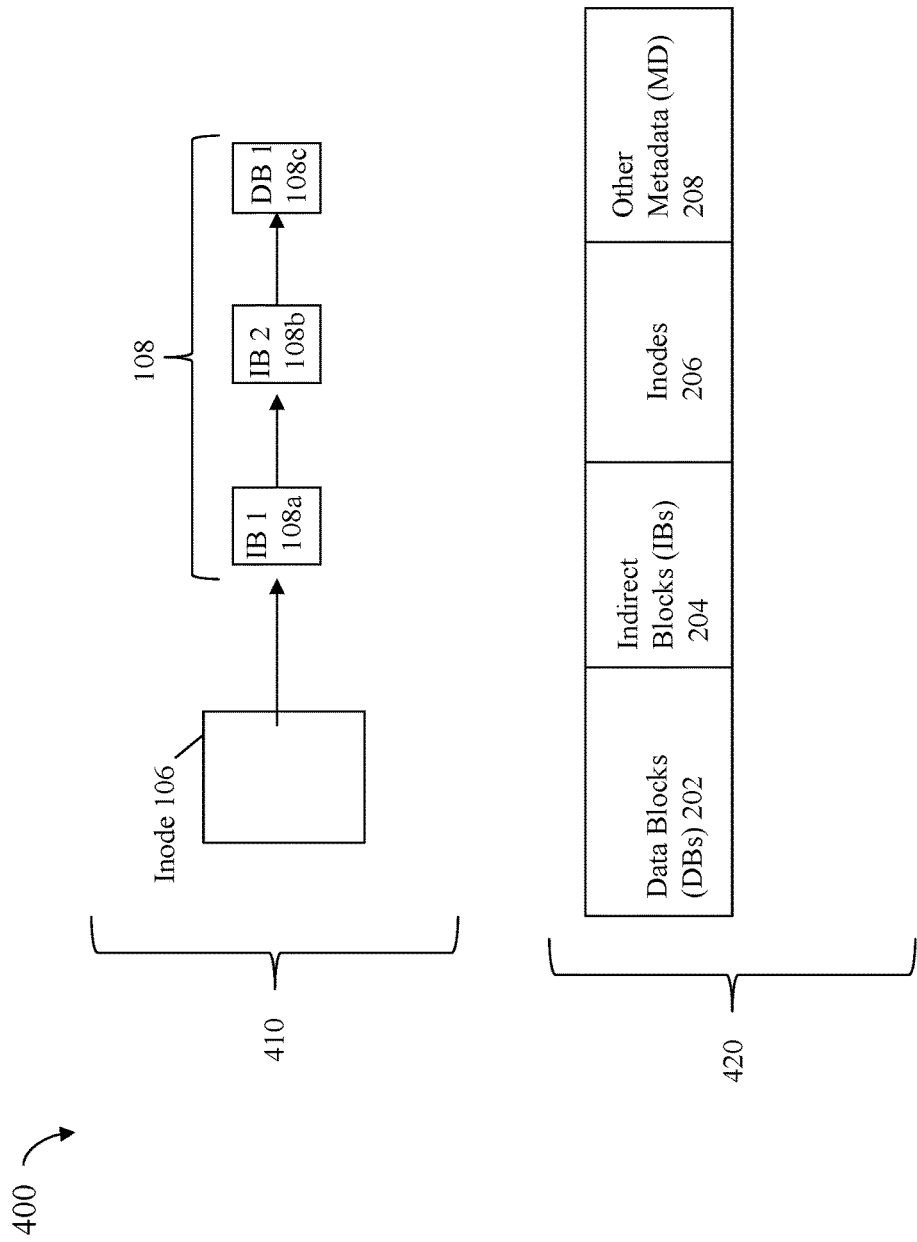
FIG. 4 is an example data structures that may be used in connection with a lower deck file system in an embodiment in accordance with techniques herein.

In at least one embodiment in accordance with techniques herein, the LDFS 28 may be a UNIX-style file system. In such a file system, an inode is a data structure used to represent a file system object, such as a directory or file. Thus with reference back to FIG. 3, each of the LD files 320, 322 and 324 may have a corresponding inode and additional associated structures such as illustrated in FIG. 4. Referring to the example 400 of FIG. 4, element 410 denotes the structures that may be utilized in the LDFS for each of the LD files 320, 322 and 324. In other words, an instance of 410 may be created and exist in the LDFS for each of the LD files 320, 322 and 324. The inode 106 for one of the LD files, such as 320, stores various file attributes and a mapping structure 108 identifying the data block location(s) of the corresponding UDFS (e.g., 302) hosted as the LD file 320. The data block locations may denote the allocated physical storage blocks for the corresponding UDFS 302.

Generally, the inode 106 contains file metadata (MD) such as, for example, the size of the file, date of last modification, ownership, permissions, and the like. There is one inode for each file in the LDFS. Additionally, each inode such as inode 106 may be uniquely identified in the LDFS by an inode number. The inode structure 106 also includes a tree structure 108, more generally referred to as a mapping structure 108. The structure 108 may include indirect blocks (IBs) which ultimately identify the data blocks (DBs) (e.g., physical storage locations) including the thin LUN data or contents. In 108, elements 108*a-b* denote IBs used to map to a single DB 108*c* that may correspond to a single block of the UDFS1 302 and its LD file1 320. More generally, the structure 108 may include similar mappings between IBs and other DBs as physical storage is allocated for the UDFS1 302. The structure 108 may be characterized in one aspect as an address map that converts a logical address of the file (and thus of UDFS1 302) to a physical address (DB) of the file. It should be noted that an IB such as 108*a-b* may be an IB pointer that points to an indirect block that contains an array of block pointers (to either other IBs or to DBs). There may be many levels of IBs arranged in a hierarchy depending upon the size of a file where each level of IBs includes pointers to Ms at the next lower level. IBs may be considered metadata blocks in contrast to DBs which are data blocks.

In connection with the UDFS1 302 in at least one embodiment, the first time there is a write to a logical block of UDFS1 302, there is no existing data block or physical storage mapped to the LBA. As a result, in response to the first write to the logical block, physical storage in the form of a data block of the LDFS 28 may be allocated and mapped (e.g., by layer 23) to the logical block of UDFS1 302. Additionally, as needed depending on embodiment, additional structures such as one or more IBs and possibly other storage may also be allocated and used in the structure 410 responsive to the first write. In this manner, the IBs and DBs of the tree structure 108 are also created in a dynamic manner as storage of the LDFS is allocated, such as responsive to first writes to logical blocks of UDFS1 302.

Referring again of FIG. 4, shown is an example of a logical address space 420 of a file system, such as LDFS 28, in an embodiment in accordance with techniques herein. The example 420 illustrates that the file system address space of LDFS 28 may include address space mapped to DBs 202, IBs 204, inodes 206, and other metadata (MD) 208 used by the LDFS 28. Generally with reference back to FIG. 3, when UDFS1 302 is created, inode 106 for its corresponding LD file 1 320 may be allocated from the portion 206 of the LDFS address space. One or more writes to UDFS1 302 result in creating a portion of the tree or mapping structure 108 including allocated DBs from 202 and IBs from portion 204 of the LDFS address space.

In at least one embodiment consistent with other discussion herein, storage for the LDFS 28 may be provisioned in physical storage portions referred to as slices which are then mapped into the address space 420 of the LDFS. The LDFS 28 may then allocate blocks of storage for DBs, IBs, inodes, and other MD as needed for files 320, 322 and 324 thereof. As also discussed above, physical storage for the LDFS may be provisioned in slices of storage from one or more RAID (redundant array of inexpensive disks) groups. A RAID group may be characterized as a logical storage entity defined from a group of physical storage devices, such as rotating disk drives, flash-based storage devices or other forms of non-volatile back end data storage devices. Physical devices of a RAID group are logically bound together to represent contiguous data storage space for applications. A RAID group represent a logically contiguous address space distributed across a set of physical storage devices of the group. Each physical storage device is subdivided into pieces used to spread the address space of the RAID group across the group (along with parity information if applicable to the RAID level). The physically contiguous pieces of the physical storage devices that are joined together to create the logically contiguous address space of the RAID group are called stripes. Stripes may form blocks and blocks may be allocated to create logical representations of storage space for use by applications within a data storage system. Each slice may denote any suitable amount of storage.

In file systems such as LDFS 28 in at least one embodiment in accordance with techniques herein, inodes, which include the metadata for a file, are stored alongside the data that comprises the content of the file in a physical storage media (e.g., PDs 16*a-n*) in a data storage system. As such, PDs 16*a-n* may store both the user or file data itself and the file system metadata that is related to it. Further, each block of an LD file of LDFS 28 may be associated with a per block metadata (also referred to herein as "BMD") that stores metadata (e.g., attributes related to sharing, checksum, and the like) for that particular block and maintains information regarding the particular file system block. For example, the BMD for a DB may include the inode number of the LD file having its data stored on the DB. The BMD for each LDFS block may be stored in any suitable location. For example, in at least one embodiment, the BMD may be stored in a leaf-level IB pointing to the DB. For example, referring to element 410 of FIG. 4, the BMD for DB1 108*c* may be stored in the leaf-level IB (e.g., IB closest to, or pointing directly to) 108*b*. The BMD for DB 108*c* may include information indicating whether the associated DB 108*c* is owned (e.g., in use or referenced by only a single entity of the LDFS), or whether the associated DB 108*c* is shared (e.g., in use or referenced by multiple entities of the LDFS).

Figure 5:
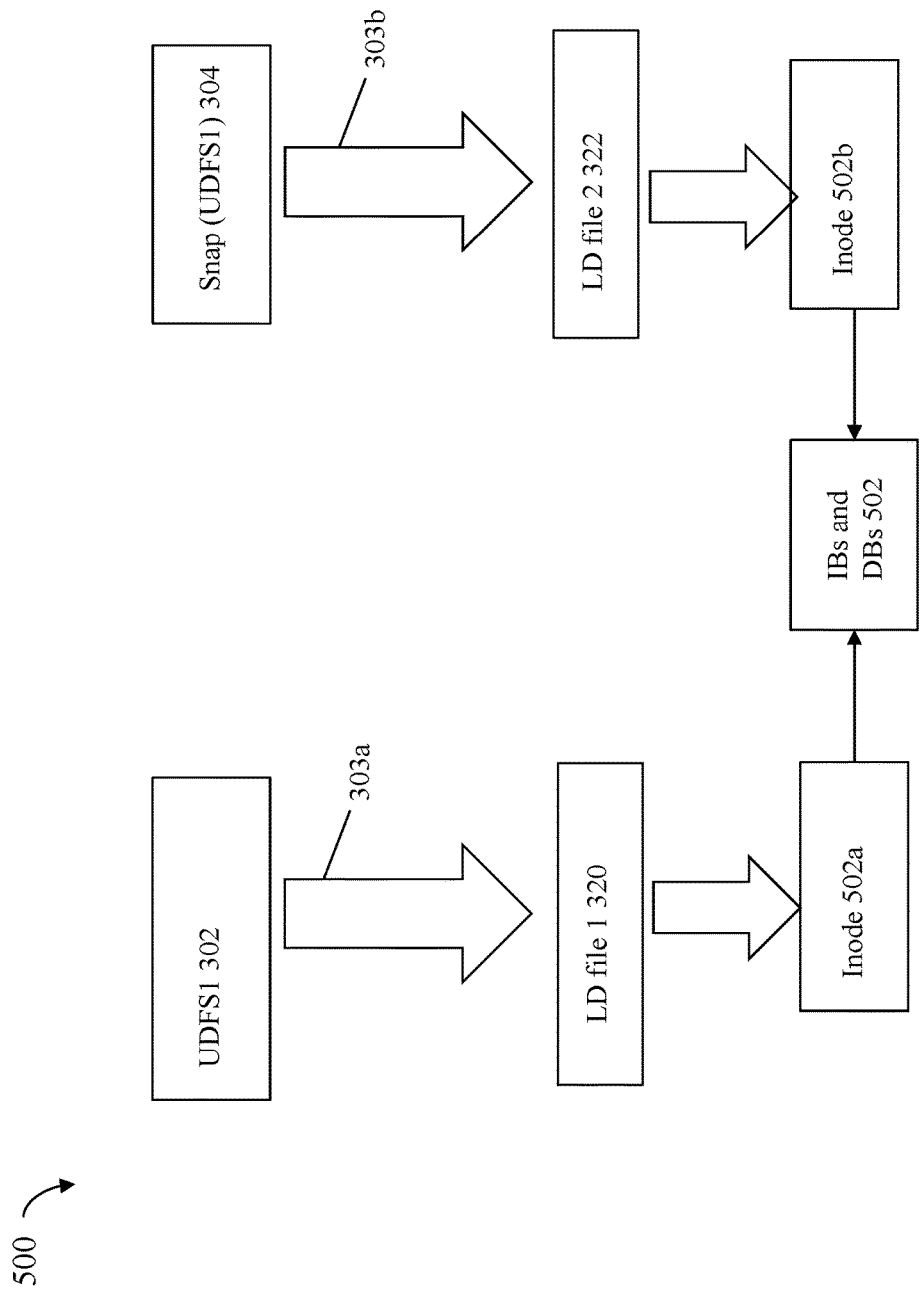
FIG. 5 is an example illustrating file systems, files, associated data structures and shared blocks that may be used in connection with a primary upper deck file system and its snapshot in an embodiment in accordance with techniques herein.

In at least one embodiment in accordance with techniques herein and with reference to FIG. 5, at a first point in time, UDFS1 302 may be created. Creating UDFS1 302 includes creating one or more LDFS file structures associated with implementing its corresponding LD file 1 320. Such file structures allocated and associated with LD file 1 320 may include corresponding inode 502*a*. Consistent with discussion elsewhere herein, DBs and associated IBs 502 may be allocated and associated with inode 502*a* as data is written to the UDFS1 320 at a second point in time subsequent to its creation. At a third point in time subsequent to the second point in time, a snapshot of a UDFS 302, such as snap USFS1 304, may be created and mounted whereby snap USFS1 304 is exposed to a host or other client. The foregoing performed at the third point in time results in allocating inode 502*b* associated with LD file 2 322 (implementing or hosting the snap USFS1 304). Additionally, the inode 502*b* may be associated with, or reference, the same set of IBs and DBs 502 as those associated with inode 502*a* (for LD file 1 320 implementing UDFS1 302). In this manner, creating a snapshot of a primary or original UDFS1 302 initially associates all IBs and DBs of the primary with its snapshot. In this manner, prior to creating the snap UDFS1 304, the BMD for all DBs 502 indicates that such DBs are only referenced or used by LD file 1 320 (e.g., indicating LD file 1 owns and solely uses or references such DBs). After creating and mounting the snap UDFS1 304, the BMD for all DBs 502, the BMD for all DBs 502 is updated to indicate that such DBs (as well as possibly other blocks such as IBs) are now shared and thereby used or referenced by multiple entities, such as by multiple LD files 320, 322. For a UDFS block that is backed free having a corresponding allocated LDFS block, information such as the BMD for the LDFS block may be used in determining whether or not to punch a hole in the LDFS block by performing hole punching (as discussed elsewhere herein). In particular, as discussed in more detail below in accordance with techniques herein, the BMD information indicating whether the LDFS block is shared or otherwise not shared (e.g., solely owned and referenced by a single LDFS entity) may be used in determining whether or not to perform the requested hole punching in connection with a particular selected option. For example, the selected option may denote a set of candidate UD file systems for which to perform hole punching where an additional requirement of the selected option is that such blocks must be owned by the particular UD file system and not shared. In contrast, the selected option may denote a set of candidate UD file systems for which to perform hole punching where the selected option further indicates that such blocks for which hole punching is performed can be shared or owned (e.g., not restricted to just owned blocks).

It should be noted that LDFS blocks that are shared are illustrated in connection with FIG. 5 as related to the snapshot data service. More generally, LDFS blocks may be shared among more than 2 LDFS entities (e.g., such as if there are multiple snapshots of 302). Also, generally, LDFS blocks may be shared among multiple LDFS entities in connection with other data services in an embodiment. For example, LDFS blocks may be shared among multiple LDFS entities, such as files, in connection with data deduplication.

Scavenge processing (also sometimes referred to as a scavenge operation or scavenging) may be performed in accordance with one or more criteria whereby corresponding code is executed, such as by the SP, to perform the scavenge processing. In at least one embodiment in accordance with techniques herein, scavenge processing may include performing one or more hole punching requests to perform hole punching with respect to UDFS blocks. Scavenge processing and hole punching are described in more detail below. Additionally, as mentioned above, the particular storage entities (e.g., such as the particular files, file systems and possibly snapshots thereof) upon which hole punching is requested are identified in accordance with an option that may be selected from multiple options in accordance with one or more criteria. Prior to further discussing the criteria and examples of different options that may be included in at least one embodiment in accordance with techniques herein, discussion is first directed to generally describing the scavenge processing and the hole punching operation and processing that may be performed on the set of candidates based on the selected option.

In response to the initiation of the scavenge operation in an embodiment in accordance with techniques herein, scavenge processing may be performed, such as by a background process that may run as a low priority process such as when the SP is idle or at times of low utilization. The processing may include accessing a set of data structures to locate backed free blocks in UDFS 24, where the backed free blocks are from the set of candidate UD file system(s) determined based on the selected option (discussed elsewhere herein in more detail). Upon locating a backed free block, such as 44*b* in UDFS 24 (FIG. 2), from a candidate UDFS, a request may be made to perform a hole punching operation on block 44*b*. As noted above, the selection option may further indicate whether to perform hole punching on only owned, non-shared LDFS blocks, or otherwise whether hole punching is performed independent of LDFS block sharing status (e.g., hole punching is performed independent of whether the LDFS block is shared or not-shared/owned).

Assume in a first exemplary option that the option indicates to limit and only perform hole punching on owned LD blocks for which there is no sharing among multiple LD files. In this case, processing is performed to determine whether to proceed with the requested hole punching of block 44*b* only if its corresponding LDFS block is not shared (e.g., among multiple LD files and thus among multiple UDFSs). Processing includes locating the corresponding LDFS block—in this case, block 42*b*—that was allocated to the UDFS in response to block 44*a* having been written into. Once block 42*b* is located, processing is performed to access BMD associated with LDFS block 42*b* which indicates whether the LDFS block 42*b* is shared or not with another LDFS entity, such as another LDFS file corresponding to another UDFS. If the BMD indicates the LDFS block 42*b* is not shared (e.g., and thus solely owned, used and referenced by a single LD file of the LDFS), hole punching is performed. Otherwise, if the BMD indicates the LDFS block 42*b* is shared, the requested hole punching is not performed.

In at least one embodiment, a request to perform hole punching with respect to an UDFS block such as 44*b* may be implemented as a call or request from the UDFS to the LDFS. In at least one embodiment, the mapping information of the mapping layer 23 as well as the BMD information indicating whether a particular mapped LDFS block is shared or not shared/owned may be accessible or exposed (e.g., directly or through supported interfaces) to the LDFS but not the UDFS. In this manner, the LDFS may or may not perform the requested hole punching (as requested by the UDFS) depending on the sharing status of the mapped LDFS block 42b. In at least one embodiment, the LDFS may return information to the UDFS that initiated the hole punching request. The returned information may indicate whether hole punching was performed for the requested UDFS block. The UDFS may use this return information to determine whether or not to update information of UDFS structures, such as the slice map and others of FIG. 6 described elsewhere herein. For example, UDFS may issue the request for hole punching to LDFS for block 44b. LDFS examines the shared state of block 42b (providing the backing storage for 44b) and may or may not perform its portion of processing of the requested hole punching. LDFS then returns information to the UDFS to notify the UDFS whether the LDFS performed its portion of the hole punching operation and thus the UDFS should accordingly perform its portion of the hole punching operation (e.g., by updating the various UDFS structures such as of FIG. 6 discussed elsewhere herein). It should be noted that the foregoing is merely one way in which processing may be partitioned, such as between the UDFS and the LDFS, and one particular interface or information exchange therebetween. Techniques herein may be implemented in other ways, such as using different interfaces, exchanging different information, and the like.

Hole punching for this first exemplary option (limited to only owned/non-shared blocks) where block 42b is owned/not shared will now be described. Hole punching includes freeing block 42b such as by deleting any data in block 42b and updating any associated state information of 42b to free and also updating any necessary metadata and LDFS structures. For example, the BMD for block 42b may updated, IBs associated with block 42b may be deallocated and/or updated, and the like. After block 42b has been freed, processing then updates another set of data structures (used by the UDFS and described in connection with FIG. 6) to indicate that block 44b is no longer a backed free block, but is rather a free block (having no backed or allocated storage) of the UDFS. In this manner, hole punch processing has disassociated block 44b from any storage in LDFS 28, although by being written into again, block 44b may become associated with another block of storage in LDFS 28.

In contrast to the first exemplary option noted above (limiting hole punching to owned/not shared LDFS block), assume now a second exemplary option that does not restrict hole punching owned/not shared LDFS blocks. In this case, processing includes locating the corresponding LDFS block—in this case, block 42b—that was allocated to the UDFS in response to block 44a having been written into. Once block 42b is located, processing is performed to access BMD associated with LDFS block 42b which indicates whether the LDFS block 42b is shared or not with another LDFS entity, such as another LDFS file corresponding to another UDFS. If the BMD indicates the LDFS block 42b is owned/not shared (e.g., and thus solely owned, used and referenced by a single LD file of the LDFS), hole punching processing may be performed as described above which results in freeing block 42b. Hole punching includes freeing block 42b such as by deleting any data in block 42b and updating any associated state information of 42b to free and also updating any necessary metadata and LDFS structures. For example, the BMD for block 42b may updated, IBs associated with block 42b may be deallocated and/or updated, and the like. After block 42b has been freed, processing then updates another set of data structures (used by the UDFS and described in connection with FIG. 6) to indicate that block 44b is no longer a backed free block, but is rather a free block (having no backed or allocated storage) of the UDFS. In this manner, hole punch processing has disassociated block 44b from any storage in LDFS 28, although by being written into again, block 44b may become associated with another block of storage in LDFS 28.

Now consider the case with the second exemplary option (that does not restrict hole punching owned/not shared LDFS blocks) where the LDFS block 42b corresponding to the backed free UDFS block 44b is shared. In such a case, hole punching will be unable to free block 42b since it is shared and thereby also referenced or in use with another LD file. Further, for this illustration and with reference back to FIG. 5, assume that block 42b is a DB of 502, where block 42b is shared by LD file 1 320 (implementing UDFS1 302) and LD file2 322 (implementing snap UDFS1 304) and where the hole punching request is a request to punch UD block 44b of UDFS 302. In at least one embodiment in accordance with techniques herein, hole punching for shared LDFS block 42b may include disassociating block 42b from the LD file inode 502a and updating any necessary LDFS metadata and LDFS structures. Such disassociation may include updating IBs or pointers and metadata associated with inode 502a. For example, in at least one embodiment, the leaf IB (that is associated with 502a and that points to block 42b) may be updated to reference or point to an "empty" or null block (indicating a punched hole block), or the leaf IP pointer may be assigned a NULL value. Hole punching may also include updating any associated BMD of block 42b to indicate the block 42b is now owned/referenced only by inode 502b (for LD file 2 322 and Snap UDFS1 304). Hole punch processing may then update another set of data structures (used by the UDFS and described in connection with FIG. 6) to indicate that block 44b is no longer a backed free block, but is rather a free block (having no backed or allocated storage) of the UDFS. In this manner, hole punch processing has disassociated block 44b from any storage in LDFS 28, although by being written into again, block 44b may become associated with another block of storage in LDFS 28. However, in this case where the LD block 42b was shared, hole punch processing has not resulted in freeing or deallocating LDFS block 42b (and rather updates its status to owned/not shared whereby the LDFS block 42b is not indicated as owned by LD file 2 322).

Generally, in the case where a hole is punched in a shared LDFS block, hole punching does not result in freeing the shared LDFS block and yet processing is performed to disassociate the punched LDFS block from the LD file 320 and also the UDFS1 302. In the case where a hole is punched in an owned/non-shared LDFS block, hole punching does reclaim LDFS space via the freed LDFS block. In this manner, options which restrict hole punching to only owned/non-shared LDFS blocks may be characterized as more focused, limited hole punching to LDFS candidate blocks which will be freed. In contrast, options which do not restrict hole punching to only owned/non-shared LDFS blocks may be characterized as less limited hole punching where an LDFS candidate block may or may not be freed. Thus, an option which limits hole punching to only owned/non-shared LDFS blocks may be desirable (relative to other options which perform hole punching independent of share/no share block status) during periods of heavy I/O workload or high CPU utilization.

Figure 6:
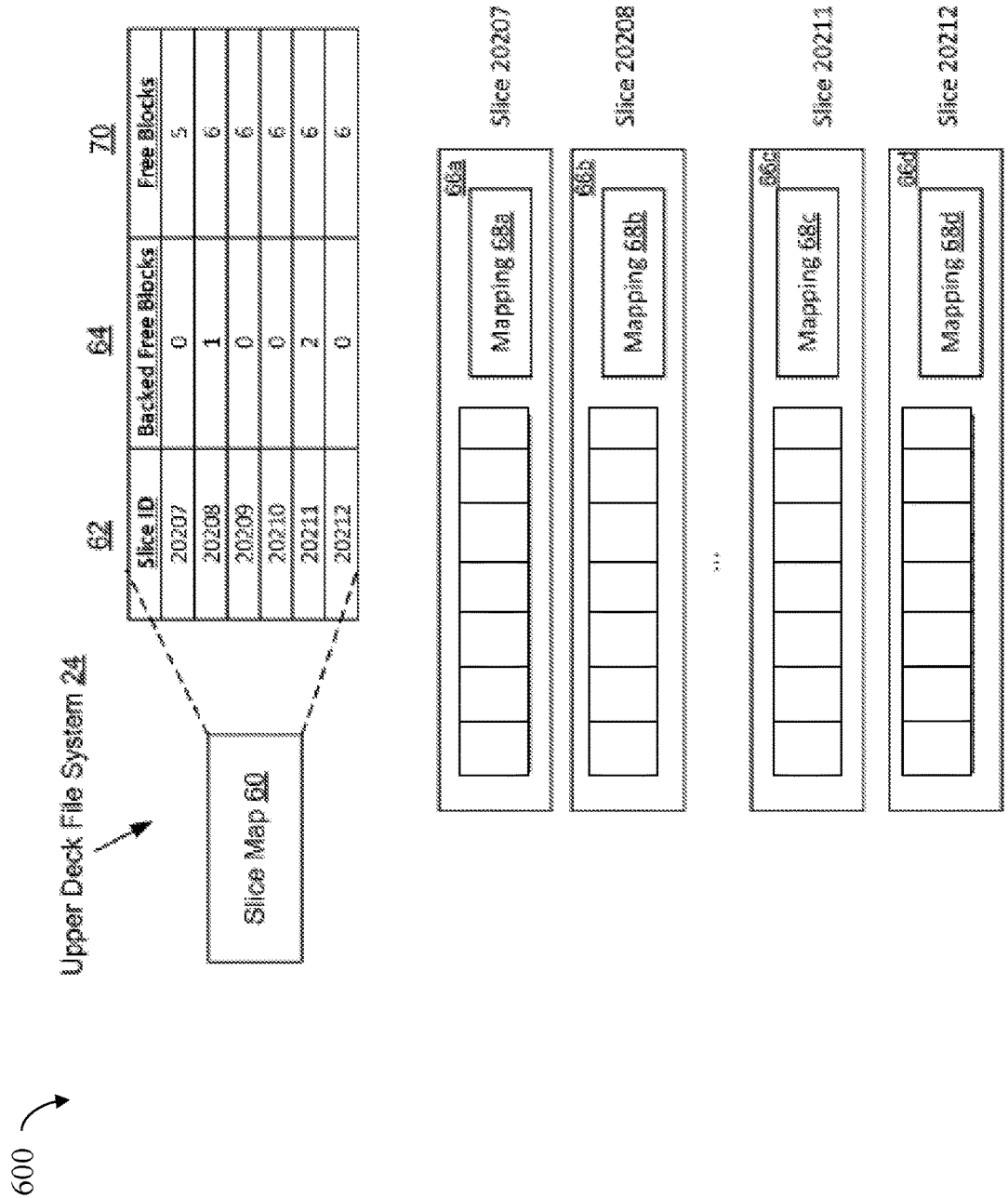
FIG. 6 is an example illustrating data structures used in connection with an upper deck file system in an embodiment in accordance with techniques herein.

As noted above, a set of data structures of the UD as illustrated in the example 600 of FIG. 6 may be used to locate backed free blocks of an UDFS in connection with scavenge processing.

Referring to FIG. 6, illustrated is an example illustrating structures of the UD that may be used in an embodiment in accordance with techniques herein. The example 600 includes a set of structures that may exist for each of the file systems of the UD, such as UDFS 24. Following paragraphs describe an example where the structures of 600 may be used in connection with UDFS 24. More generally, such a set of structures is also used in connection with each instance of an UD file system.

The example 600 includes a slice map 60 and slices 66a, 66b, 66c, and 66d (slices 66). Slice map 60 is a data structure which tracks the number of free blocks and the number of backed free blocks in each slice 66 of the UDFS 24. In the example illustrated in FIG. 6, slice map 60 takes the form of a table having a slice ID field 62, a backed free blocks field 64, and free blocks field 70 which includes all free blocks in its count. Slice ID field 62 provides an identifier for each slice in upper deck file system 24. Backed free blocks field 64 provides, for each slice identifier 62, a count indicating a current number of backed free blocks within the respective slice.

Also illustrated in FIG. 6 are example slices 66 that house logical blocks within UDFS 24. Within each slice 66, there is a mapping construct 68 that identifies the locations of the backed free blocks within that slice. In some arrangements, mapping construct 68 may be a bitmap in which each bit indicates whether a UDFS logical block corresponding to that bit is a backed free block. During operation, slice map 60 may be accessed and used in connection with performing the background scavenge processing as described herein. One particular use of map 60 is in locating backed free blocks of a particular UDFS, such as in connection with scavenging as described elsewhere herein.

In connection with techniques herein, any suitable one or more trigger conditions may be used in determining whether to initiate a scavenge operation. Upon the occurrence of one such defined trigger condition, scavenge processing may be initiated. For example, an embodiment may aggregate the number of backed free blocks in backed free blocks field 64 across all slices to produce an aggregated number of backed free blocks in the UDFS. In this case, if the aggregated number of backed free blocks is greater than a predetermined threshold number of backed free blocks, then the scavenge operation may be initiated. As other examples, scavenge processing may be triggered responsive to a command (such as a user-entered command), at predetermined scheduled or periodic time intervals, and the like.

Assume that the structures of FIG. 6 are associated with an UDFS which is included in the candidate set of entities identified, by the selected option, for use in connection with scavenge processing and thus hole punching. In such a case, upon initiating the scavenge operation, processing performs a lookup on the slice map 60 to determine which slices 66 have at least one backed free block. For each such slice 66—in the example illustrated in FIG. 6, slices 66b and 66c—processing accesses the corresponding mapping constructs (68b/68c) in the respective slice. In the example of mapping construct 68b being a bitmap, processing includes reading that bitmap to determine positions of bits indicating which UD logical blocks within slice 66b are backed free blocks. Upon making this determination, processing may be performed to make a hole punching request to the LDFS. As described elsewhere herein, hole punching may be conditionally performed as described above in accordance with the selected option and whether the selected option further limits hole punching to only those UD blocks backed by owned, non-shared LDFS blocks.

For each backed free block for which storage processor 16 punches a hole, the backed-free block counter 64, corresponding to slice 66b, may be decremented by one. The free counter 70 may be decremented when a free block is written into and may be incremented when an allocated UDFS block is deleted.

As mentioned elsewhere, an embodiment in accordance with techniques herein may define multiple options. Each of the options may define different entity selection criteria denoting which data storage entities, such as which UD file systems, to select as candidates for scavenging. Furthermore, one or more of the options may include further restrictions or limitations limiting hole punching to particular types of corresponding LDFS blocks. In particular, an option may limit hole punching to only those corresponding LDFS blocks, providing backing storage for backed free blocks in the candidate UD file system, that are owned/not shared.

Referring to FIG. 7, shown is a table of options that may be used in at least one embodiment in accordance with techniques herein. The table 700 illustrates exemplary options that may be included in at least one embodiment. As will be appreciated by those skilled in the art, generally, any one or more of the options of table 700, as well as others, may be used in an embodiment in accordance with techniques herein. From the particular available options of table 700, one may be selected (e.g., effective or active) whereby scavenge processing is performed based on the selected one option.

The table 700 includes two columns—option 710 and description 712. Each of the entries or rows 701-706 corresponds to one of the options (denoted by column 710) available for selection. Column 712 of a row is a description of the candidate UD file systems and blocks upon which hole punching is performed for the particular option of the row. Additionally, the description may include further restrictions or conditions, for example, that may denote when to stop hole punching may further limit the particular blocks of a UDFS for which hole punching is performed, and the like.

In at least one embodiment in accordance with techniques herein, snapshots may be read only or read/write (modifiable). In connection with the various options discussed, those options which are applicable to snapshots may be applicable to both read only and read/write snapshots, unless more specifically noted. As a variation, an embodiment may further specify options which are variations of those of 700, where the option may be applicable to only the read only snapshots, or applicable to only the read/write snapshots.

Row 701 indicates the option 1 (column 710) performs hole punching only on primary UDFSs but not on snapshots of the primary UDFSs. Further row 701 indicates that hole punching is performed only when the backing LDFS blocks are owned/not shared. Option 1, as restricted to only primary UDFSs and only owned blocks, avoids unnecessary MD updates in the LD which do not also result in freeing a LD block. However, option 1 may result in freeing less LD blocks that if expanded to hole punching of all LD blocks independent of sharing or owned status.

Row 702 indicates the option 2 (column 710) performs hole punching on both the primary UDFSs and associated snapshots, and only when the backing LDFS blocks are owned/not shared. Option 2, as restricted to only owned blocks, avoids unnecessary MD updates in the LD which do not also result in freeing a LD block. However, also performing hole punching on any/all snaps may ultimately resulting in freeing LD blocks that were previously shared with a primary UDFS.

Row 703 indicates the option 3 (column 710) performs hole punching on only the primary UDFSs but not on snapshots of such primary UDFSs, and for all backing LDFS blocks independent of sharing status (e.g., perform hole punching for all backing LDFS blocks which are owned/not shared as well as shared). Option 3, as restricted to only primary UDFSs and both owned and shared LDFS blocks, may cause unnecessary MD updates in the LD which do not also result in freeing a LD block. However, option 3 may result in freeing more LD blocks that if hole punching of all LD blocks is restricted to only owned status.

Row 704 indicates the option 4 (column 710) performs hole punching on the primary UDFSs and also the snapshots of such primary UDFSs, and for all backing LDFS blocks independent of sharing status (e.g., perform hole punching for all backing LDFS blocks which are owned/not shared as well as shared). Of all the options, option 4 is the least restrictive and results in freeing as many LD blocks as possible, but may cause unnecessary MD updates in the LD which do not also result in freeing a LD block. Further, option 4 may adversely impact I/O path or general system performance.

In at least one embodiment in accordance with techniques herein, snapshots may be read only or read/write (modifiable), as noted above. In connection with an optimization to option 4, an embodiment may additionally have a flag or indicator in the UDFS global state information for each read only snapshot that indicates whether scavenging or hole punching has already been performed for such read only snapshot. Use of such flags results in avoiding repeated scavenge processing and repeated hole punching of read only snapshots. Typically, repeatedly performing scavenging and hole punching on a read only snapshot is not likely to result in obtaining additional freed LD blocks, and thus, the flags as noted above may be used as a processing optimization in connection with option 4, as well as possibly any other option which may specify to scavenge or hole punch read only snapshots.

Row 705 indicates the option 5 (column 710) performs hole punching on only the primary UDFSs and only on the oldest snapshot each such primary UDFS, and for all backing LDFS blocks independent of sharing status (e.g., perform hole punching for all backing LDFS blocks which are owned/not shared as well as shared). Row 706 indicates the option 6 (column 710) performs hole punching on only the primary UDFSs and only on R/W snapshots of each such primary UDFS. Row 706 and for all backing LDFS blocks independent of sharing status (e.g., perform hole punching for all backing LDFS blocks which are owned/not shared as well as shared). Row 706 also specifies a stop condition denoting when the stop hole punching. The stop condition for hole punching of 706 is when a minimum threshold of free backed blocks remain. In other words, as hole punching results in changing UDFS blocks from backed free to free (unbacked), the count of backed free blocks decreases. Once this count reaches the minimum threshold number, hole punching stops.

In connection with option 6, it may be desirable to use stop criteria that stops hole punching when a minimum threshold of free backed blocks remain. When storage is needed by the UDFS, the needed storage allocation may be obtained using a free back UDFS block, or by requesting a newly allocated LDFS block. It may be beneficial and improve efficiency to utilize backed free blocks over requesting a newly allocated LDFS block.

Any suitable value may be selected and used as the minimum threshold. For example, a minimum threshold may be 20% of free backed blocks, whereby scavenging stops when reach this threshold is reached. Put another way, the stop condition may indicate to only scavenge 80%, or a specified numeric threshold, of backed free blocks of UDFS and its R/W snaps. An embodiment may further specify multiple such thresholds limiting scavenging and hole punching, such as per UDFS or per snapshot. An embodiment may further vary the thresholds with UDFSs and snapshots (e.g., may use a different threshold for an UDFS than its snapshot). An embodiment may set a threshold denoting a collective threshold applicable collectively across all UD file systems and snapshots. Also, more generally, such a stop condition and thresholds as used in option 6 may be used in connection with any of the options noted herein as a further condition to limit scavenging.

Information, such as the file systems, data structures, and the like, used in connection with techniques herein may be persistently stored on non-volatile storage. In some embodiments, the non-volatile storage may include forms of flash-based storage or, more generally as known in the art, types of storage which have a life expectancy based on the number of writes/erasures. As such, an embodiment in accordance with techniques herein may include the foregoing as a factor in the criteria used to select a particular option. For example, the criteria may include an indicator denoting whether all, or some portion, of the information used in connection with techniques herein is persistently stored on flash-based storage. If so, the indicator may result in selection of an option which is expected to reduce or limit the amount of unnecessary MD updates thereby also reducing the number of writes/modifications made to data structures as stored on the flash-based storage.

An embodiment in accordance with techniques herein may also use other heuristics in addition to, or in place of, those described above in connection with the various options of FIG. 7. The heuristics may be included in selection criteria of another option used to specify the candidate set of UD file systems or otherwise limit the particular blocks punched in such UD file systems. Alternatively, the heuristics may be used to order or prioritize UD file systems and/or UD files which are selected as candidates for scavenging in connection with an option. For example, an embodiment in accordance with techniques herein may monitor the access patterns in connection with UD files systems and/or particular UD files in such UD file systems. UD file systems and/or files that have the highest frequency of modification by overwriting may be given preference or higher priority (e.g., over others with lower modification frequency) when scavenging. As such frequency of overwriting an existing portion of a file may be used in ranking or prioritizing that file, portion of the file, or its containing UD file system, relative to other candidates denoting by an option. As a variation the selection criteria itself of an option may indicate to limit or restrict hole punching to only candidate UD files and/or file systems having an observed frequency of overwriting which exceeds a specified threshold level.

In at least one embodiment in accordance with techniques herein, the selected option may be configurable or selectable, such as by a user via a user interface, in a configuration file, and the like. An embodiment may have a preselected or default option that may be subsequently modified or configured. The selection of an option may be performed manually, such as via a user-specified option selection, as well as dynamically and automatically selected. For example, an embodiment may periodically and automatically execute code which selects one of the available options based on one or more criteria, some of which are described herein. For example, as mentioned elsewhere herein, such criteria may include factors assessing available data storage system resources, such as whether the CPUs (e.g., an SP) of the data storage system is idle or busy (e.g., CPU utilization is at or below a threshold may denote low or idle utilization level) whether I/O workload is heavy (e.g., whether I/O rate such as measured in I/Os per second is above a threshold; whether back-end or front end data transfer rate such as in bytes/second is above a threshold; average I/O response time; component utilization rates such as related to DAs, HAs), and the like. At times when the assessment indicates heavy I/O workload or high CPU utilization, one of the more/most restrictive options may be selected (e.g., select option 1 or 2 rather than option 4).

Figure 8:
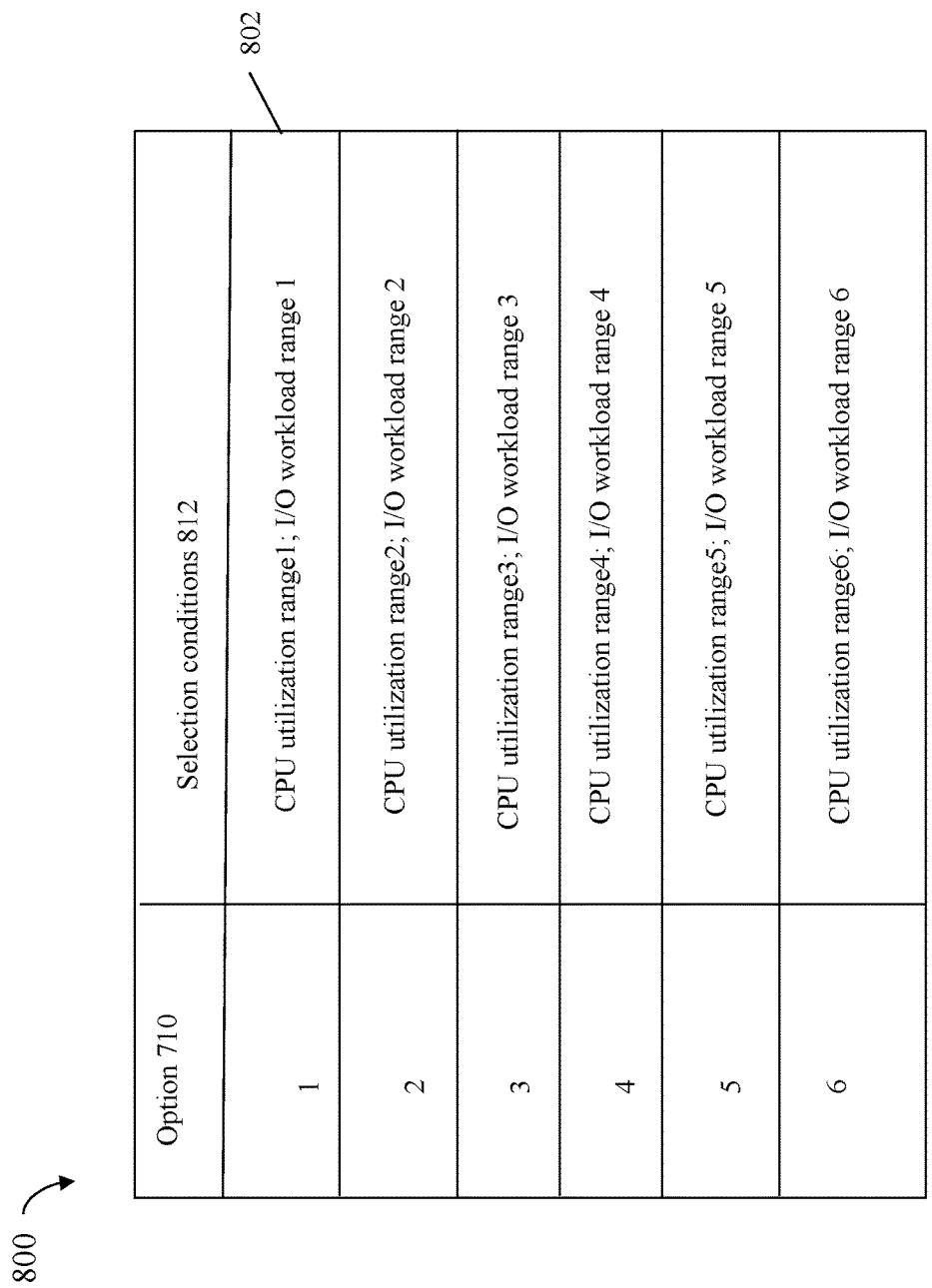
FIG. 8 is a table including options and associated selection conditions that may be used in an embodiment in accordance with techniques herein.

Additionally, each of the selectable or available options may have associated conditions identifying when to select such an option. For example, referring to FIG. 8, shown is a table 800 including a first column of options 710 and a second column of selection conditions 812. Table 800 includes an entry or row for each option as in connection with FIG. 7. Additionally, for each option, column 812 specifies conditions which, if met, result in selecting the particular option. For example, row 802, column 812 includes CPU utilization range1 and I/O workload range 1, where CPU utilization range1 denotes a CPU utilization range (e.g., percentage range) and I/O workload range 1 denotes an I/O workload range (e.g., such as range of I/O rate, data transfer rate, average I/O response time range). A current observed CPU utilization measurement and a current observed I/O workload measurement may be obtained and processing may be performed to determine whether the current measurements are within the ranges denoted by column 812 of row 802. If so, processing may result in automatic selection of option 1. As a variation, an embodiment may automatically make such an assessment and selection as just described but may further require user confirmation before changing the current option setting to that as automatically selected as 1. Other options of the table 800 may also similarly specify desired ranges which may be used to trigger selection of such options. It should be noted that ranges in column 812 specified across all 6 options may be mutually exclusive so that only a single one of the options 6 may be deterministically selected. As a variation, an embodiment may specify ranges or other conditions on column 812 across all 6 options such that multiple options may be triggered or selected. In such a case, further criteria may be used in selecting from among such multiple triggered or selected options (e.g., present to user and let user select; use another heuristic to automatically select from among such multiple options).

What will now be described are flowcharts of processing steps that may be performed in an embodiment in accordance with techniques herein. The flowcharts summarize processing as described above.

Figure 9:
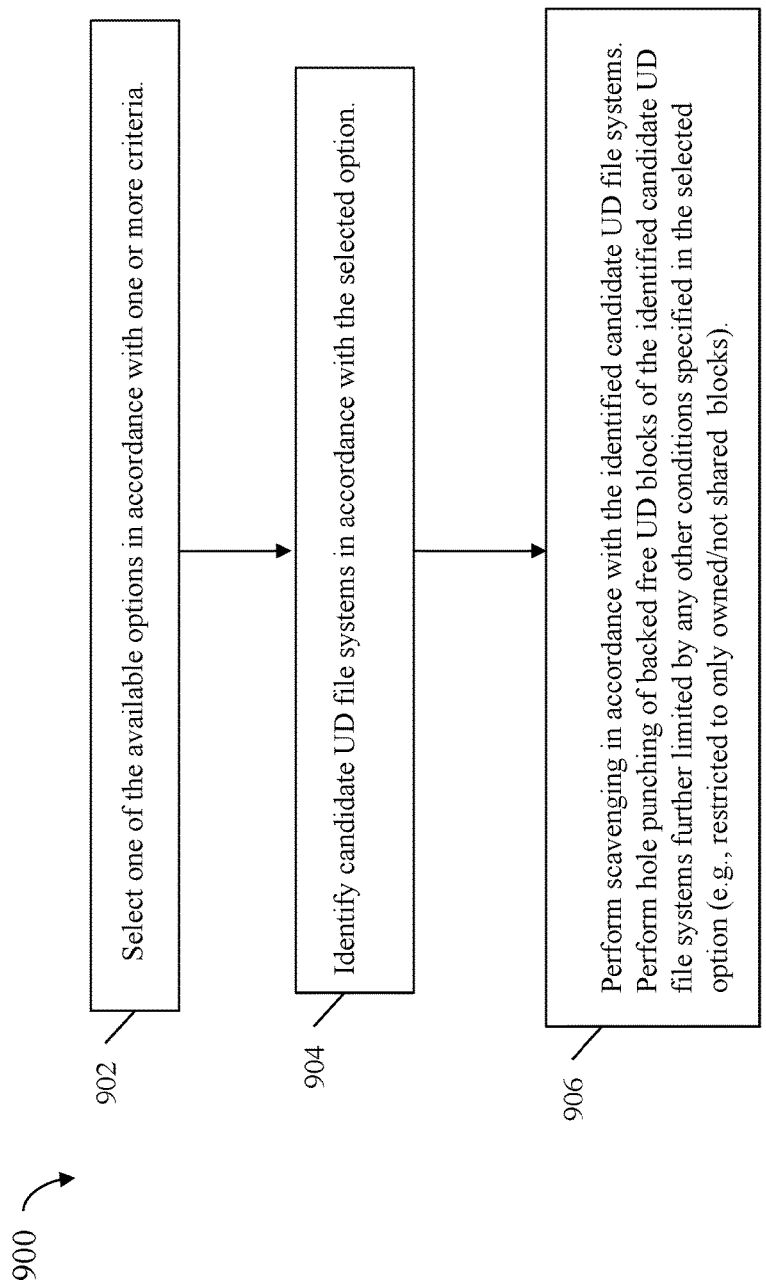
FIGS. 9 and 10 are flowcharts of processing steps that may be performed in an embodiment in accordance with techniques herein.

Referring to FIG. 9, shown is a first flowchart 900 of processing steps that may be performed in an embodiment in accordance with techniques herein. At step 902, processing is performed to select one of the available options in accordance with one or more criteria. From step 902, control proceeds to step 904. At step 904, processing is performed to identify one or more candidate UD files systems in accordance with the selected option. From step 904, control proceeds to step 906. At step 906, scavenging is performed in accordance with the identified candidate UD file systems. Step 906 may include performing hole punching of backed free UD blocks of the identified candidate UD file systems further limited by any other conditions specified in the selected option (e.g., restricted to only owned/not shared blocks). It should be noted that steps 904 and 906 may be performed by the background scavenging process as described above where such scavenging process may be executed continuously, periodically, responsive to certain trigger conditions, or more generally, in accordance with any execution conditions or frequency desired. Step 902 may be performed initially, such as based on a default setting or updated configured selection as described above (e.g., may perform manual update to selected option, automatic periodic assessment and possible update of the selected option).

Figure 10:
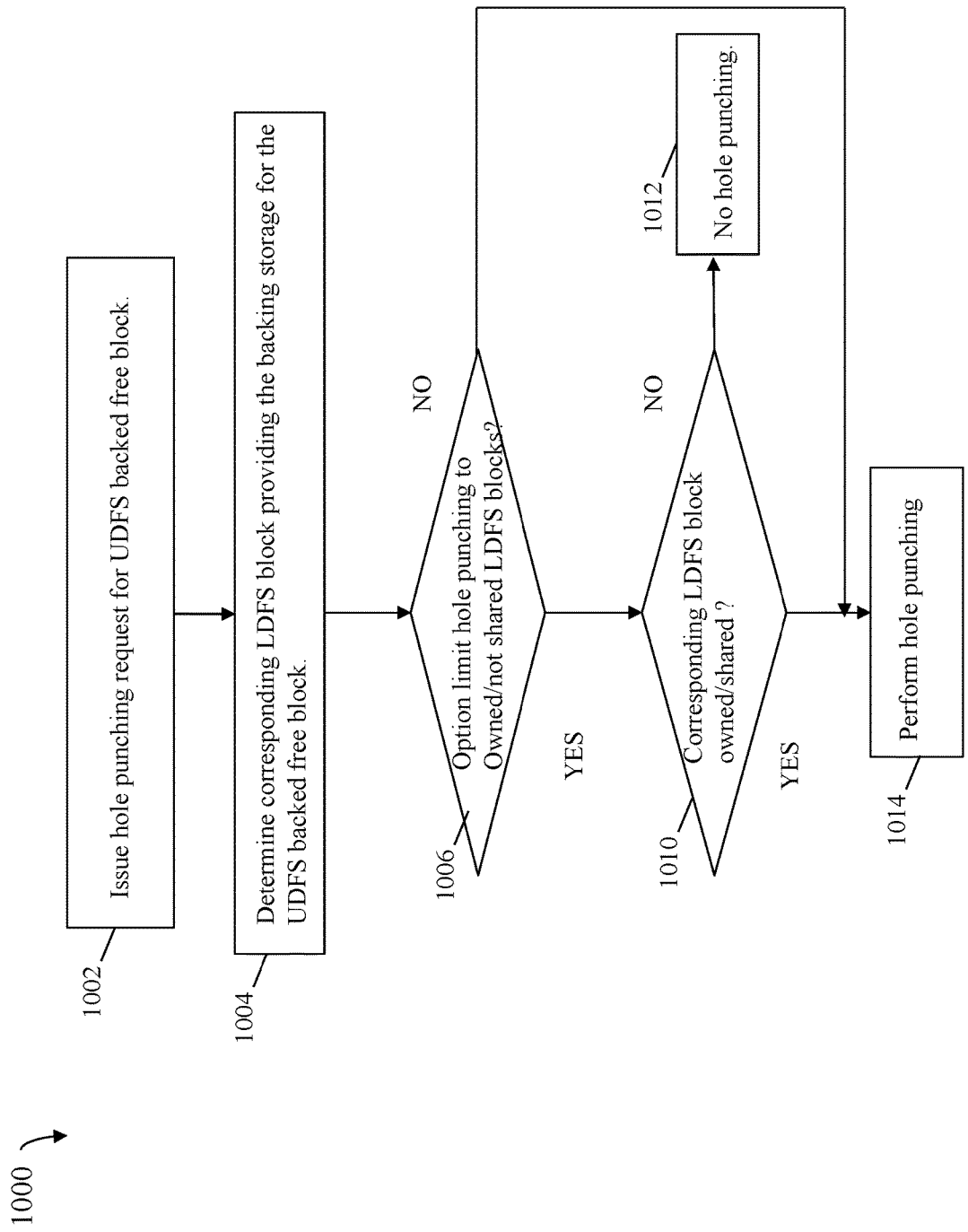

Referring to FIG. 10, shown is a second flowchart 1000 of processing steps that may be performed in an embodiment in accordance with techniques herein. In at least one embodiment, the steps of flowchart 1000 may be performed by the scavenging process for each UDFS block that is a backed free block of a candidate UD file system. At step 1002, a hole punching request may be issued for the UDFS backed free block. From step 1002, control proceeds to step 1004. At step 1004, processing is performed to determine the corresponding LDFS block providing the backing storage for the UDFS backed free block identified in the hole punching request of step 1002. Control proceeds from step 1004 to step 1006. At step 1006, a determination is made as to whether the option includes additional restrictions or conditions that limit hole punching to only owned/not shared blocks. If step 1006 evaluates to no, control proceeds to step 1014 where hole punching is performed. If step 1006 evaluates to yes, control proceeds to step 1010. At step 1010, a determination is made as to whether the corresponding LDFS block is owned/not shared, or otherwise shared. If the LDFS block is owned/not shared, whereby step 1010 evaluates to yes, control proceeds to step 1014 to perform hole punching. If the LDFS block is otherwise shared, whereby step 1010 evaluates to no, control proceeds to step 1012 where no hole punching is performed.

It should be noted that, as discussed above, options may include additional conditions that restrict or limit the amount of hole punching performed. In such cases, it is straight forward to those skilled in the art to further modify or adapt the logical flow as generalized in connection with FIGS. 9 and 10.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:
1. A method of scavenging blocks comprising:
   determining, in accordance with a selected option, a set of candidate upper deck file systems, wherein at least a first of the candidate upper deck file systems has storage allocated from at least one block of a lower deck file system; and
   performing, in accordance with the selected option, scavenging of the set of candidate upper deck file systems to attempt to free blocks of the lower deck file system, wherein said scavenging further includes:

issuing a request to perform hole punching of a backed free block of the first candidate upper deck file system, wherein the backed free block has first provisioned storage that is associated with a block of the lower deck file system, and wherein said hole punching includes:

determining whether the backed free block has a corresponding lower deck file system block that is shared with another lower deck file system entity, or otherwise not shared with another lower deck file system entity;

responsive to determining the backed free block has a corresponding lower deck file system block that is not shared with another lower deck file system entity, freeing the corresponding lower deck file system block; and responsive to determining the backed free block has a corresponding lower deck file system block that is shared with another lower deck file system entity, not freeing the corresponding lower deck file system block.

2. The method of claim 1, wherein each of the candidate upper deck file systems is implemented as a file in the lower deck file system, and wherein the first candidate upper deck file system is implemented as a first file in the lower deck file system, and a second of the candidate upper deck file systems is implemented as a second file in the lower deck file system.

3. The method of claim 2, wherein the corresponding lower deck file system block is shared between only the first and second files of the lower deck file system.

4. The method of claim 3, wherein said hole punching further comprises:

responsive to determining the backed free block has a corresponding lower deck file system block that is shared with another lower deck file system entity, modifying the status of the corresponding lower deck file system block to not shared.

5. The method of claim 4, wherein said hole punching includes:

updating a status associated with the backed free block of the first candidate upper deck file system to free.

6. The method of claim 1, further comprising:

selecting, in accordance with one or more criteria, the selected option from a plurality of options, wherein each of the plurality of options specifies a different set of candidate upper deck file systems for which scavenging is performed, when said each option is selected, to attempt to free blocks of the lower deck file system.

7. A method of scavenging blocks comprising:

determining, in accordance with a selected option, a set of candidate upper deck file systems, wherein at least a first of the candidate upper deck file systems has storage allocated from at least one block of a lower deck file system;

performing, in accordance with the selected option, scavenging of the set of candidate upper deck file systems to attempt to free blocks of the lower deck file system, wherein said scavenging further includes:

issuing a request to perform hole punching of a backed free block of the first candidate upper deck file system, wherein the backed free block has first provisioned storage that is associated with a block of the lower deck file system; and selecting, in accordance with one or more criteria, the selected option from a plurality of options, wherein each of the plurality of options specifies a different set of candidate upper deck file systems for which scavenging is performed, when said each option is selected, to attempt to free blocks of the lower deck file system, wherein the plurality of options includes one or more of:

a first option indicating to perform hole punching only on primary upper deck file systems and not on snapshots of primary upper deck file systems, and wherein hole punching is only performed for blocks of a primary upper deck file system having storage provisioned from corresponding lower deck file system blocks that are not shared;

a second option indicating to perform hole punching on both primary upper deck file systems and snapshots of primary upper deck file systems, and wherein hole punching is only performed for blocks of a primary upper deck file system having storage provisioned from corresponding lower deck file system blocks that are not shared;

a third option indicating to perform hole punching only on primary upper deck file systems and not on snapshots of primary upper deck file systems, and wherein hole punching is performed for blocks of a primary upper deck file system having storage provisioned from corresponding lower deck file system blocks that are either shared or not shared;

a fourth option indicating to perform hole punching on both primary upper deck file systems and snapshots of primary upper deck file systems, and wherein hole punching is performed for blocks of a primary upper deck file system having storage provisioned from corresponding lower deck file system blocks that are either shared or not shared;

a fifth option indicating to perform hole punching on primary upper deck file systems and only on oldest snapshots of primary upper deck file systems, and wherein hole punching is performed for blocks of a primary upper deck file system having storage provisioned from corresponding lower deck file system blocks that are either shared or not shared; and a sixth option indicating to perform hole punching on primary upper deck file systems and only read-write snapshots of primary upper deck file systems, and wherein hole punching stops when a minimum threshold of backed free blocks of the upper deck file system remain.

8. The method of claim 7, wherein a data storage system includes the lower deck file system and a plurality of upper deck file systems, wherein physical storage devices of the data storage system provide provisioned storage for allocated blocks of the lower deck file system mapped to blocks of the plurality of upper deck file systems that have been written to.

9. The method of claim 8, wherein the one or more criteria include at least one criteria related to current I/O workload on the data storage system.

10. The method of claim 8, wherein the one or more criteria include at least one criteria related to utilization of a component of the data storage system.

11. The method of claim 10, wherein the at least one criteria relates to utilization of: a processor that executes code, a component that reads data from and writes data to the physical storage devices, a component that receives I/O requests from a client.

12. A system comprising:

at least one processor; and a memory comprising code stored thereon that, when executed, performs a method of scavenging blocks comprising:

determining, in accordance with a selected option, a set of candidate upper deck file systems, wherein at least a first of the candidate upper deck file systems has storage allocated from at least one block of a lower deck file system; and performing, in accordance with the selected option, scavenging of the set of candidate upper deck file systems to attempt to free blocks of the lower deck file system, wherein said scavenging further includes:

issuing a request to perform hole punching of a backed free block of the first candidate upper deck file system, wherein the backed free block has first provisioned storage that is associated with a block of the lower deck file system, and wherein said hole punching includes:

determining whether the backed free block has a corresponding lower deck file system block that is shared with another lower deck file system entity, or otherwise not shared with another lower deck file system entity;

responsive to determining the backed free block has a corresponding lower deck file system block that is not shared with another lower deck file system entity, freeing the corresponding lower deck file system block; and responsive to determining the backed free block has a corresponding lower deck file system block that is shared with another lower deck file system entity, not freeing the corresponding lower deck file system block.

13. A non-transitory computer readable medium comprising code stored thereon that, when executed, performs a method of scavenging blocks comprising:

determining, in accordance with a selected option, a set of candidate upper deck file systems, wherein at least a first of the candidate upper deck file systems has storage allocated from at least one block of a lower deck file system; and performing, in accordance with the selected option, scavenging of the set of candidate upper deck file systems to attempt to free blocks of the lower deck file system, wherein said scavenging further includes:

issuing a request to perform hole punching of a backed free block of the first candidate upper deck file system, wherein the backed free block has first provisioned storage that is associated with a block of the lower deck file system, and wherein said hole punching includes:

determining whether the backed free block has a corresponding lower deck file system block that is shared with another lower deck file system entity, or otherwise not shared with another lower deck file system entity;

responsive to determining the backed free block has a corresponding lower deck file system block that is not shared with another lower deck file system entity, freeing the corresponding lower deck file system block; and responsive to determining the backed free block has a corresponding lower deck file system block that is shared with another lower deck file system entity, not freeing the corresponding lower deck file system block.

14. The non-transitory computer readable medium of claim 13, wherein each of the candidate upper deck file systems is implemented as a file in the lower deck file system, and wherein the first candidate upper deck file system is implemented as a first file in the lower deck file system, and a second of the candidate upper deck file systems is implemented as a second file in the lower deck file system.

15. The non-transitory computer readable medium of claim 14, wherein the corresponding lower deck file system block is shared between only the first and second files of the lower deck file system.

16. The non-transitory computer readable medium of claim 15, wherein said hole punching further comprises:

responsive to determining the backed free block has a corresponding lower deck file system block that is shared with another lower deck file system entity, modifying the status of the corresponding lower deck file system block to not shared.

17. The non-transitory computer readable medium of claim 16, wherein said hole punching includes:

updating a status associated with the backed free block of the first candidate upper deck file system to free.

18. The non-transitory computer readable medium of claim 13, wherein the method further comprises:

selecting, in accordance with one or more criteria, the selected option from a plurality of options, wherein each of the plurality of options specifies a different set of candidate upper deck file systems for which scavenging is performed, when said each option is selected, to attempt to free blocks of the lower deck file system.

19. A system comprising:

at least one processor; and a memory comprising code stored thereon that, when executed, performs a method of scavenging blocks comprising:

determining, in accordance with a selected option, a set of candidate upper deck file systems, wherein at least a first of the candidate upper deck file systems has storage allocated from at least one block of a lower deck file system;

performing, in accordance with the selected option, scavenging of the set of candidate upper deck file systems to attempt to free blocks of the lower deck file system, wherein said scavenging further includes:

issuing a request to perform hole punching of a backed free block of the first candidate upper deck file system, wherein the backed free block has first provisioned storage that is associated with a block of the lower deck file system; and selecting, in accordance with one or more criteria, the selected option from a plurality of options, wherein each of the plurality of options specifies a different set of candidate upper deck file systems for which scavenging is performed, when said each option is selected, to attempt to free blocks of the lower deck file system, wherein the plurality of options includes one or more of:

a first option indicating to perform hole punching only on primary upper deck file systems and not on snapshots of primary upper deck file systems, and wherein hole punching is only performed for blocks of a primary upper deck file system having storage provisioned from corresponding lower deck file system blocks that are not shared;

a second option indicating to perform hole punching on both primary upper deck file systems and snapshots of primary upper deck file systems, and wherein hole punching is only performed for blocks of a primary upper deck file system having storage provisioned from corresponding lower deck file system blocks that are not shared;
a third option indicating to perform hole punching only on primary upper deck file systems and not on snapshots of primary upper deck file systems, and wherein hole punching is performed for blocks of a primary upper deck file system having storage provisioned from corresponding lower deck file system blocks that are either shared or not shared;
a fourth option indicating to perform hole punching on both primary upper deck file systems and snapshots of primary upper deck file systems, and wherein hole punching is performed for blocks of a primary upper deck file system having storage provisioned from corresponding lower deck file system blocks that are either shared or not shared;
a fifth option indicating to perform hole punching on primary upper deck file systems and only on oldest snapshots of primary upper deck file systems, and wherein hole punching is performed for blocks of a primary upper deck file system having storage provisioned from corresponding lower deck file system blocks that are either shared or not shared; and
a sixth option indicating to perform hole punching on primary upper deck file systems and only read-write snapshots of primary upper deck file systems, and wherein hole punching stops when a minimum threshold of backed free blocks of the upper deck file system remain.

20. A non-transitory computer readable medium comprising code stored thereon that, when executed, performs a method of scavenging blocks comprising:
determining, in accordance with a selected option, a set of candidate upper deck file systems, wherein at least a first of the candidate upper deck file systems has storage allocated from at least one block of a lower deck file system;
performing, in accordance with the selected option, scavenging of the set of candidate upper deck file systems to attempt to free blocks of the lower deck file system, wherein said scavenging further includes:
issuing a request to perform hole punching of a backed free block of the first candidate upper deck file system, wherein the backed free block has first provisioned storage that is associated with a block of the lower deck file system; and
selecting, in accordance with one or more criteria, the selected option from a plurality of options, wherein each of the plurality of options specifies a different set of candidate upper deck file systems for which scavenging is performed, when said each option is selected, to attempt to free blocks of the lower deck file system, wherein the plurality of options include one or more of:
a first option indicating to perform hole punching only on primary upper deck file systems and not on snapshots of primary upper deck file systems, and wherein hole punching is only performed for blocks of a primary upper deck file system having storage provisioned from corresponding lower deck file system blocks that are not shared;
a second option indicating to perform hole punching on both primary upper deck file systems and snapshots of primary upper deck file systems, and wherein hole punching is only performed for blocks of a primary upper deck file system having storage provisioned from corresponding lower deck file system blocks that are not shared;
a third option indicating to perform hole punching only on primary upper deck file systems and not on snapshots of primary upper deck file systems, and wherein hole punching is performed for blocks of a primary upper deck file system having storage provisioned from corresponding lower deck file system blocks that are either shared or not shared;
a fourth option indicating to perform hole punching on both primary upper deck file systems and snapshots of primary upper deck file systems, and wherein hole punching is performed for blocks of a primary upper deck file system having storage provisioned from corresponding lower deck file system blocks that are either shared or not shared;
a fifth option indicating to perform hole punching on primary upper deck file systems and only on oldest snapshots of primary upper deck file systems, and wherein hole punching is performed for blocks of a primary upper deck file system having storage provisioned from corresponding lower deck file system blocks that are either shared or not shared; and
a sixth option indicating to perform hole punching on primary upper deck file systems and only read-write snapshots of primary upper deck file systems, and wherein hole punching stops when a minimum threshold of backed free blocks of the upper deck file system remain.

* * * * *